Sept. 8, 1936.  L. STICKLEY  2,053,382
WOOD JOINT CONSTRUCTION
Filed Jan. 21, 1935
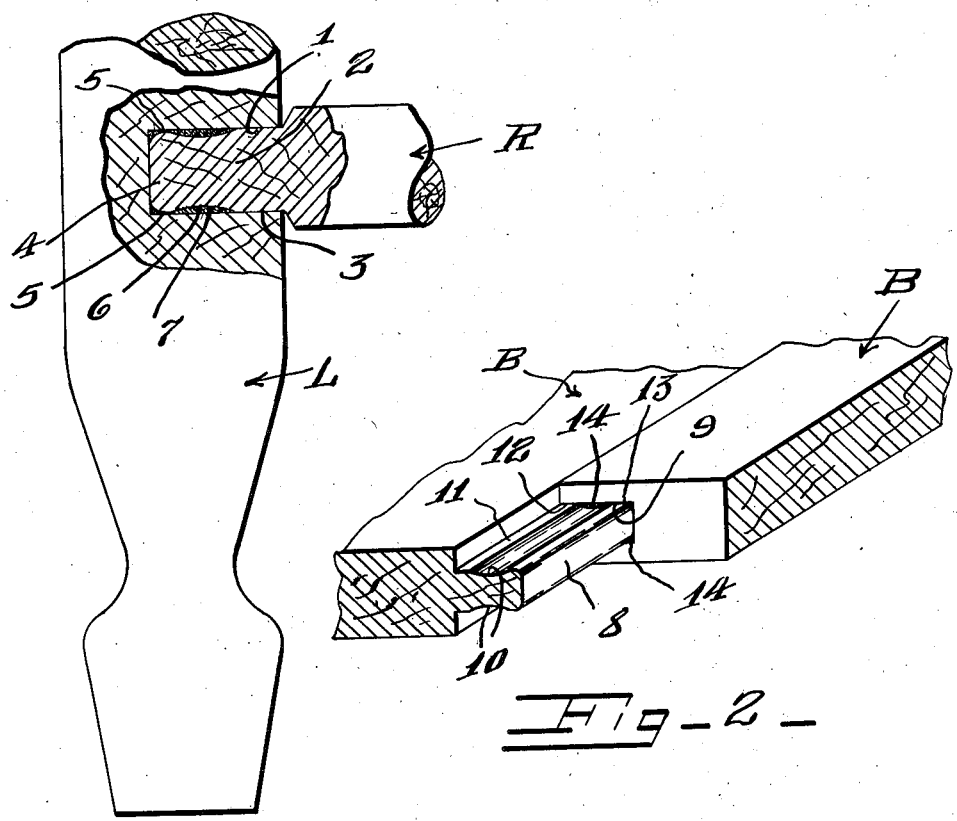
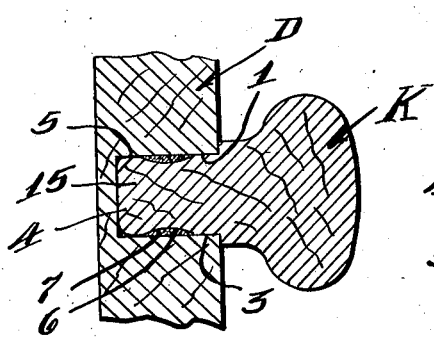
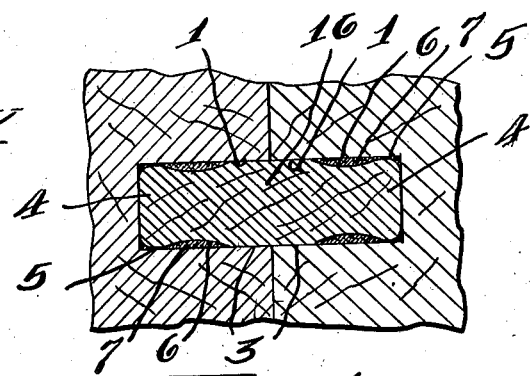
INVENTOR.
Leopold Stickley.
Bedell & Thompson
ATTORNEYS.

Patented Sept. 8, 1936

2,053,382

UNITED STATES PATENT OFFICE 2,053,382

WOOD JOINT CONSTRUCTION

Leopold Stickley, Fayetteville, N. Y.

Application January 21, 1935, Serial No. 2,699

3 Claims. (Cl. 20—92)

This invention relates to joints between two parts, which are fitted together, and has for its object a joint of this character wherein the two parts so fitted together are secured against separation without the addition of mechanical instrumentalities, as keys, mechanical interlocks, etc., but by an initially, liquid binder, which, when it sets or hardens, positively interlocks or wedges the two parts together. More especially, the joint is for woodwork or for joining two wood parts together which may be joined by a pin and socket or by mortise and tenon or by dowel pins and the like.

It also is of particular advantage in joining together two parts, as for instance, the rungs and legs of a piece of furniture or other articles of the like nature, where the wood parts are liable to separate or the joints become loose in ordinary use.

It always has been extremely difficult to join the rungs of chairs, etc., to the legs so that they will remain permanently secured indefinitely and without the use of special mechanical locking devices, as keys, etc.

The invention consists in the novel features and in the combinations and constructions hereinafter set forth and claimed.

In describing this invention, reference is had to the accompanying drawing, in which like characters designate corresponding parts in all the views.

Figure 1 is a fragmentary elevation, partly in section, showing my invention as applied to the rung and leg of a piece of furniture.

Figure 2 is an isometric view of two parts, as two boards, joined by a mortise and tenon joint embodying my invention.

Figure 3 is a fragmentary sectional view of two parts joined together, as a knob or handle and a part, as a drawer, to which the knob is applied.

Figure 4 is a sectional view of a dowel pin provided with my invention securing two parts together.

This invention comprises, generally, a recess or socket formed in one of the parts to be secured and a projection snugly fitting the entrance of the recess or socket with the intermediate part being formed preferably with a shallow wide groove with the inner end portion of the projection formed with a clearance between it and the wall of the recess or socket, and an initially liquid binder, which is capable of setting or hardening, between the projection and the wall of the recess or socket, the construction being such that when the projection is moved into the recess, the liquid binder, which has been placed in the recess or grooves, is forced and compressed around the pin and in the groove, filling it but is prevented from passing out by the base portion of the projection which fits with a drive fit the entrance of the recess or socket. Thus, when the binder hardens, it forms an interlock or wedge which holds the joint intact indefinitely. It is preferable to form the groove in the projection rather than in the wall of the recess, as the external groove can be more economically formed in the projection than an internal groove can be formed in the recess or socket, and without appreciable extra cost of manufacture over similar conventional joints without the interlocking binding feature, which constitutes the subject matter of this invention.

In Figure 1, L designates the leg of a piece of furniture, as a chair leg, having a cylindrical socket 1 therein for receiving the pin or spindle 2 at the end of a rung R. The spindle 2 at its base 3 snugly fits with a drive fit the entrance of the cylindrical socket 1 and the inner end portion 4 of the pin loosely fits the socket or recess 1, or is formed with a clearance at 5 for the binder. The intermediate portion of the spindle 2 is formed with a peripheral, circumferential, shallow groove 6 which communicates along one side with the clearance at 5. 7 designates an initially liquid binder which is capable of setting or hardening.

When the rung is being assembled, with the chair leg, the liquid binder having been placed in the recess or socket 1 is forced through the clearance 5 and compressed in the groove 6, but is prevented from spewing out of the socket by the snug fit between the base portion 3 of the spindle 2 and the wall of the entrance of the socket or recess 1, and this causes the liquid or semi-liquid binder to be compressed tightly in the groove, and into the wall of the socket or the pores thereof. When the binder sets or hardens, it forms a wedge or interlock which absolutely prevents the working loose of the joint.

In Figure 2, the parts joined together are shown as boards B with matched joints, one being formed with a projection or tenon 8 and the other with a recess or groove 9 for receiving the tenon. The tenon is formed with grooves 10 on opposite sides thereof corresponding to the groove 6 in Figure 1, and the base portion 11 of the tenon snugly fits with a drive fit into the entrance 12 of the groove 9. Likewise, a clearance at 13 for the binder 14 is provided at the inner margin of the tenon, so that while the mortise and tenon are being brought together, the binder, which has been previously placed in the mortise, is forced around through the clearance 13 into the groove 10 and compressed therein and is prevented from passing out of the groove by the drive fit at 12.

In Figure 3, the two parts joined together are shown as a front wall D of a drawer of a piece of furniture and a knob K having a spindle 15 substantially the same as the spindle 2 of Figure 1.

In Figure 4, two parts are shown as joined together by a dowel pin 16, both ends of which are formed as the spindle 2 of Figure 1 and secured in sockets in both parts, the same as the spindle 2 is secured in the socket 1 in Figure 1.

This joint is particularly advantageous in woodworking, as it costs no more than the ordinary joint and results in the permanent securing together of two parts which will not come loose under any normal or abnormal conditions, to which the parts are subjected in the ordinary use to which the articles in which the joint is incorporated, are subjected.

What I claim is:—

1. In a joint for woodwork, the combination of two wood parts to be secured together, one of said parts being formed with a recess having smooth side walls and the other with a projection in the recess and placeable in the recess by movement of one part relatively to the other, and an initially liquid, hardenable binder between the projection and the wall of the recess, the projection being formed with a shallow groove arcuate in cross section in each of the lateral sides thereof, the inner portion of the projection being of less diameter than the other portion and formed to fit with a clearance the wall of the recess to permit the binder to flow from the inner end of the recess over the inner portion of the projection into the groove, the portion of the projection engaging the wall of the recess at the entrance thereof fitting the same with a drive fit, all whereby the binder is compressed around the inner end of the projection and in the groove and against the smooth side wall of the recess forming a wedging joint.

2. In a joint for woodwork, the combination of two wood parts to be joined together, one being formed with a cylindrical smooth bore socket and the other with a cylindrical pin in the socket, and an initially liquid hardenable binder between the pin and the walls of the socket, the pin being provided with a single shallow circumferential groove having its bottom wall arcuate in cross section and the groove being located between the entrance and the bottom of the socket, and the portion of the pin in the entrance of the socket fitting the socket with a drive fit, the portion of the pin between the groove and the inner end of the pin being of less diameter than the portion at the entrance of the socket and fitting the socket with a clearance to permit the binder to flow from the inner end of the socket over the inner portion of the pin into the groove, and the groove being of sufficient width to extend from the inner portion of the pin to the portion of the pin in the entrance of the socket, all whereby the binder is compressed around the pin and in the groove and against the smooth walls of the socket forming a wedging joint.

3. In a joint for woodwork, the combination of two wood parts to be secured together, one of said parts being formed with a recess having smooth side walls and the other with a projection in the recess and placeable in the recess by movement of one part relatively to the other, and an initially liquid, hardenable binder between the projection and the wall of the recess, the projection being formed with a shallow groove in each of the lateral sides thereof presenting inclined surfaces to the walls of the recess, the inner portion of the projection being of less diameter than the other portion and formed to fit with a clearance the wall of the recess to permit the binder to flow from the inner end of the recess over the inner portion of the projection into the groove, the portion of the projection engaging the wall of the recess at the entrance thereof fitting the same with a drive fit, all whereby the binder is compressed around the inner end of the projection and in the groove and against the smooth side walls of the recess forming a wedging joint.

LEOPOLD STICKLEY.